(12) United States Patent
Li et al.

(10) Patent No.: US 10,757,731 B2
(45) Date of Patent: *Aug. 25, 2020

(54) METHOD AND SYSTEM FOR OFDMA RANDOM ACCESS

(71) Applicant: Apple Inc., Cupertino, CA (US)

(72) Inventors: Guoqing Li, Campbell, CA (US); Joonsuk Kim, Saratoga, CA (US); Christiaan A. Hartman, San Jose, CA (US); Syed Aon Mujtaba, Santa Clara, CA (US); Chiu Ngok E. Wong, San Jose, CA (US); Yong Liu, Campbell, CA (US); Su Khiong Yong, Palo Alto, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/383,155

(22) Filed: Apr. 12, 2019

(65) Prior Publication Data
US 2019/0239250 A1 Aug. 1, 2019

Related U.S. Application Data

(63) Continuation of application No. 15/099,055, filed on Apr. 14, 2016, now Pat. No. 10,264,602.
(Continued)

(51) Int. Cl.
*H04W 74/00* (2009.01)
*H04W 74/08* (2009.01)
*H04L 5/00* (2006.01)

(52) U.S. Cl.
CPC ....... *H04W 74/006* (2013.01); *H04W 74/085* (2013.01); *H04L 5/0007* (2013.01);
(Continued)

(58) Field of Classification Search
CPC ............ H04W 74/006; H04W 74/0833; H04L 5/0007; Y02B 60/50
See application file for complete search history.

(56) References Cited

U.S. PATENT DOCUMENTS

| 10,264,602 B2 | 4/2019 | Li et al. | |
|---|---|---|---|
| 2003/0137993 A1* | 7/2003 | Odman | H04L 29/06 370/468 |

(Continued)

*Primary Examiner* — Oussama Roudani
(74) *Attorney, Agent, or Firm* — Sterne, Kessler, Goldstein & Fox P.L.L.C.

(57) ABSTRACT

Some embodiments are directed to grouping electronic devices into contention groups to reduce uplink Orthogonal Frequency-Division Multiple Access (OFDMA) random access (OFDMA-RA) collisions. An access point may explicitly assign an electronic device to a contention group, or the electronic device may implicitly determine an assignment to the contention group. To explicitly assign a device to a contention group, the access point may randomly assign or assign based on a criteria of the electronic device. Examples of criteria include an association identifier (AID), a traffic type/quality of service (QoS) category, a power saving preference, and an association status. The electronic device may implicitly determine a contention group assignment based on the total number of contention groups. The electronic device may use the explicitly or implicitly assigned contention group number to determine whether the electronic device may contend for a given trigger frame random access (TF-R) frame.

20 Claims, 8 Drawing Sheets

Related U.S. Application Data (60) Provisional application No. 62/147,727, filed on Apr. 15, 2015.

(52) U.S. Cl.
CPC ......... *H04W 74/0833* (2013.01); *Y02D 70/00* (2018.01); *Y02D 70/142* (2018.01)

(56) References Cited

U.S. PATENT DOCUMENTS

| | | | |
|---|---|---|---|
| 2015/0049686 A1* | 2/2015 | Liang | H04W 74/006 370/329 |
| 2015/0146557 A1* | 5/2015 | Pan | H04L 5/0051 370/252 |
| 2015/0382283 A1* | 12/2015 | Wang | H04W 52/0216 370/328 |
| 2016/0143006 A1* | 5/2016 | Ghosh | H04W 74/004 370/329 |
| 2016/0262185 A1* | 9/2016 | Ghosh | H04W 72/04 |
| 2016/0269993 A1* | 9/2016 | Ghosh | H04W 52/0229 |

\* cited by examiner

METHOD AND SYSTEM FOR OFDMA RANDOM ACCESS

This application is a continuation of U.S. patent application Ser. No. 15/099,055, filed on Apr. 14, 2016, titled "Controlled OFDMA Random Access," which claims the benefit of U.S. Provisional Patent Application No. 62/147,727, filed on Apr. 15, 2015, titled "Group-Based OFDMA Random Access," both of which are hereby incorporated by reference in their entireties.

BACKGROUND

Field

The described embodiments relate to techniques for wireless communication among electronic devices, and more specifically, to reducing collisions in wireless communications.

Related Art

When communicating information through a wireless local area network (WLAN), Orthogonal Frequency-Division Multiple Access (OFDMA) random access (OFDMA-RA) may be used as an uplink channel access mechanism where different electronic devices use different OFDMA-RA sub-channel frequencies of a channel bandwidth to communicate. This communication technique may be used during wireless communication between electronic devices in accordance with a communication protocol, such as the Institute of Electrical and Electronics Engineers (IEEE) 802.11 standard (which is sometimes referred to as "Wi-Fi"). This communication technique may also be used with a wide variety of other communication protocols. OFDMA-RA is beneficial in high density scenarios; as the number of contending stations and/or electronic devices increases, however, the OFDMA-RA sub-channel contention success rate decreases significantly.

SUMMARY

The described embodiments relate to techniques for controlled Orthogonal Frequency-Division Multiple Access (OFDMA) random access (OFDMA-RA) in conjunction with contention groups to reduce collisions, especially when the number of contending electronic devices increases.

Embodiments include a method, computer program product, and system for grouping electronic devices into different contention groups to reduce uplink OFDMA-RA collisions, especially when the number of contending electronic devices increases. For example, access point may explicitly assign an electronic device to a contention group, or the electronic device may implicitly determine an assignment to the contention group. To explicitly assign a device to a contention group, the access point may randomly assign the electronic device to a contention group, and/or utilize one or more criteria of the electronic device to determine membership in a contention group. Examples of criteria include an association identifier (AID), a traffic type/quality of service (QoS) category, a power saving preference, and an association status. For the electronic device to implicitly determine an assignment to the contention group, the access point determines and transmits the number of contention groups (e.g., the total) to the electronic device. The electronic device may receive the number and use the number to determine an implicit assignment to a contention group. The electronic device may use the explicitly and/or implicitly assigned contention group number to determine whether the electronic device may contend for a given trigger frame random access (TF-R) frame.

Some embodiments include an electronic device receiving a first TF-R frame during an OFDMA-RA communication, where the first TF-R frame includes a contention group indication. The electronic device determines that the contention group indication corresponds to the electronic device, and reduces a counter value. The electronic device also determines that the counter value satisfies a threshold value. When the electronic device receives a second TF-R frame that includes the same contention group indication and an OFDMA-RA sub-channel frequency, the electronic device transmits a frame via the OFDMA-RA sub-channel frequency.

In some embodiments, the contention group indication correlates to a criteria of the electronic device. The criteria is based at least in part on an association identifier (AID). Example embodiments also include the electronic device receiving a beacon that identifies M contention groups, and determining a contention group number assignment based at least in part on the M contention groups and the AID.

In some examples, the criteria includes a traffic type/quality of service (QoS) category, an association status, and/or a power saving requirement. The M contention groups and/or the contention group indication correlation with a criteria, may be based on a collision probability determined by an access point from which the first TF-R is received, and/or a number of electronic devices communicating with an access point from which the first TF-R is received.

Some embodiments may include an electronic device receiving an assignment of a contention group number of the M contention groups in response to the electronic device associating with an access point. In some embodiments, an electronic device may receive during an OFDMA-RA communication, an assignment of a contention group number of the M contention groups in a new medium access control (MAC) frame.

BRIEF DESCRIPTION OF THE FIGURES

The accompanying drawings, which are incorporated herein and form part of the specification, illustrate the present disclosure and, together with the description, further serve to explain the principles of the disclosure and enable a person of skill in the relevant art(s) to make and use the disclosure.

The present disclosure is described with reference to the accompanying drawings. In the drawings, generally, like reference number s indicate identical or functionally similar elements. Additionally, generally, the left-most digit(s) of a reference number identifies the drawing in which the reference number first appears.

DETAILED DESCRIPTION

OFDMA random access (OFDMA-RA) can be used as an uplink (UL) channel access mechanism for electronic devices or stations, where different electronic devices contend for different OFDMA-RA portions or OFDMA-RA sub-channel frequencies of a communication channel bandwidth.

Figure 1:
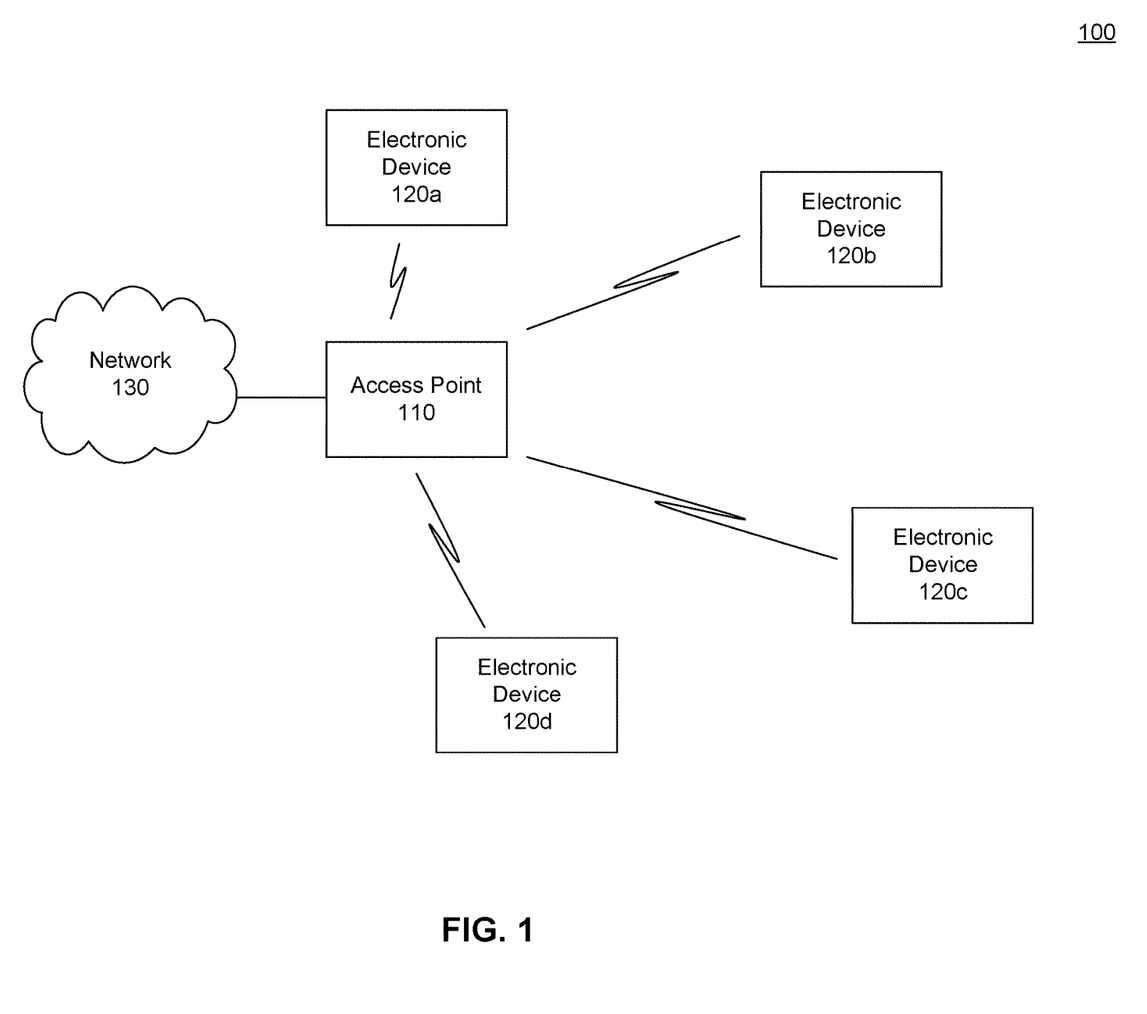
FIG. 1 is a block diagram that illustrates a system, according to example embodiments of the disclosure.

FIG. 1 is a block diagram that illustrates system 100, according to example embodiments of the disclosure. System 100 includes access point 110 that provides electronic devices 120a-120d with access to network 130. Electronic device 120 may include but is not limited to a cellular phone, a smart phone, a tablet, a personal digital assistant (PDA), or a laptop. Network 130 may include but is not limited to include any combination of local area networks (LANs), metropolitan area networks (MANs), wireless local area networks (WLANs), and/or the Internet.

Electronic devices 120a and 120d that are in proximity to access point 110 may associate with access point 110. In addition, electronic devices 120a may utilize at least one of three channel access mechanisms to transmit UL frames (e.g., physical layer convergence procedure protocol data units (PPDUs)) to access point 110: (a) legacy or enhanced distributed channel access (EDCA) to access the full channel bandwidth; (b) scheduled OFDMA (OFDMA-S) which can poll traffic to schedule UL frames into an UL OFDMA; or (c) OFDMA-RA. But, when electronic devices such as electronic devices 120b and 120c are not in proximity to access point 110, especially if electronic devices 120b and 120c are low-power electronic devices, OFDMA-S or OFDMA-RA are the two channel access mechanisms for transmitting UL frames (e.g., EDCA may not work). Further, when an electronic device 120 such as electronic device 120c is not in proximity to and has not yet associated with access point 110 (e.g., electronic device 120c transmits pre-associated UL frames), OFDMA-RA may be the only channel access mechanism available.

Figure 2:
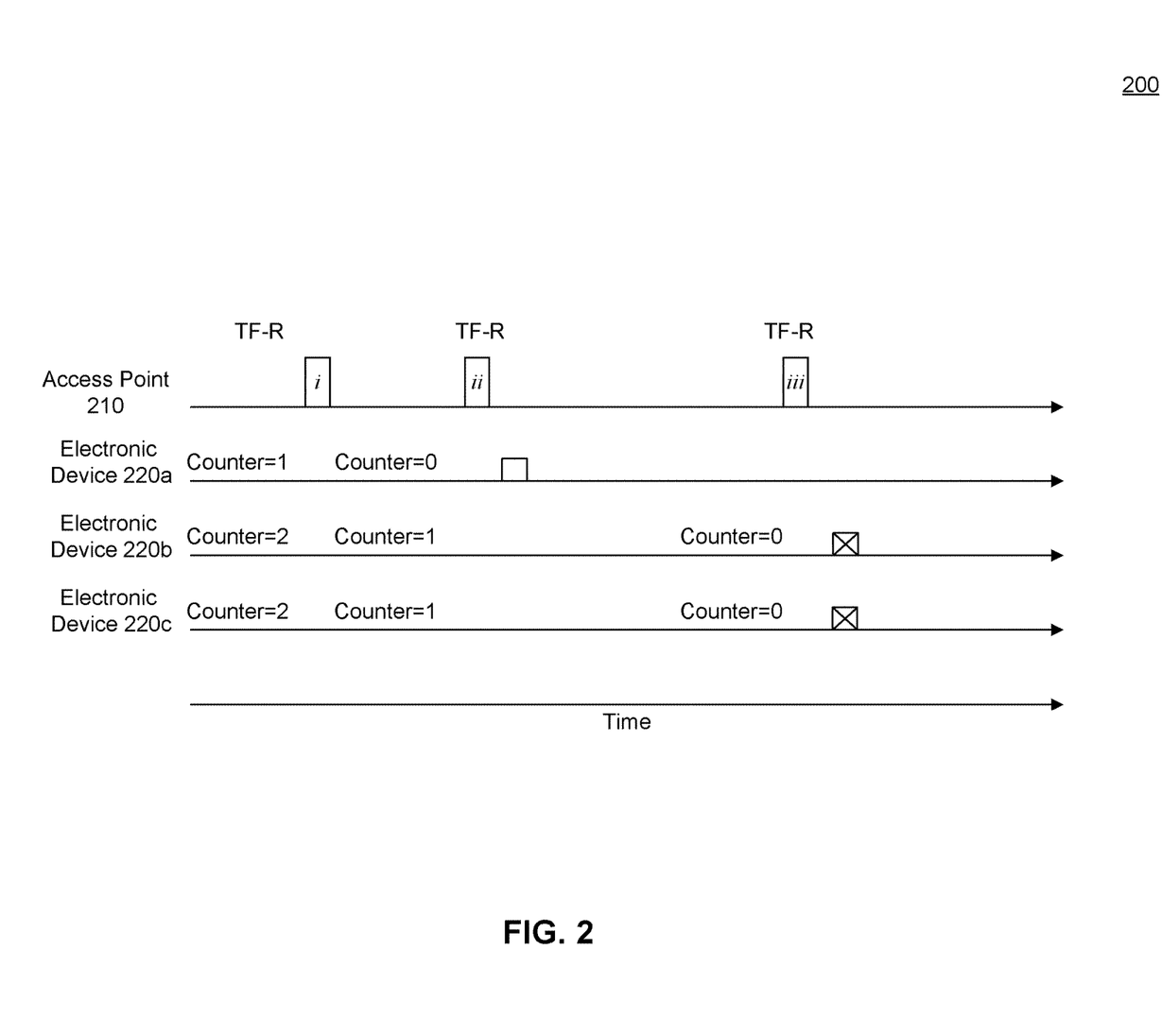
FIG. 2 illustrates an example uplink (UL) channel access mechanism.

FIG. 2 illustrates an example UL channel access mechanism 200. Access point 210 is equivalent to access point 110, and electronic devices 220 are equivalent to electronic devices 120. During OFDMA-RA, access point 210 may provide or transmit trigger frame random access (TF-R) frames that are received by electronic devices 220a-220c. The TF-R frames may be transmitted periodically (such as 20 MHz) or with a variable time interval between the TF-R frames. Electronic devices 220a-220c which are equivalent to electronic devices 120a-120c may have a counter that counts down (e.g., by 1) from initial (random or pseudorandom) counter values for each received TF-R frame. Once a counter value satisfies a threshold value (e.g., the counter value reaches 0), an electronic device 220 may transmit on or contend for an OFDMA-RA sub-channel frequency identified in the next TF-R frame received.

For example, the initial counter value for electronic devices 220a-220c may be an integer random number in the interval between 1 and a contention window (CW), where CW is a value that starts from a minimum value $CW_{min}$ that may be common to the electronic devices 220. As an example, the counter value for electronic device 220a is 1, electronic device 220b is 2, and electronic device 220c is 2. After TF-R(i) frame is received, the respective counter for each electronic device 220 counts down. Accordingly, the counter value for electronic device 220a is 0, electronic device 220b is 1, and electronic device 220c is 1. When a counter satisfies a threshold value (e.g., the counter value for electronic device 220a reaches 0), electronic device 220a may contend for one or more OFDMA-RA sub-channel frequencies (e.g., resource units) identified in the next TF-R frame received. Contending for one or more OFDMA-RA sub-channel frequencies includes transmitting on the one or more OFDMA-RA sub-channel frequencies identified. In this example, electronic device 220a transmits on an OFDMA-RA sub-channel frequency identified in TF-R(ii) frame. After receiving TF-R(ii) frame, counters in electronic devices 220b and 220c count down to 0, and their respective counter values then satisfy a threshold value (e.g., assuming that their threshold values are equal to 0).

Electronic devices 220b and 220c subsequently receive TF-R(iii) frame and both randomly choose an OFDMA-RA sub-channel frequency identified in TF-R(iii) frame. If electronic devices 220b and 220c choose different OFDMA-RA sub-channel frequencies (assuming more than one OFDMA-RA sub-channel frequency is identified in TF-R(iii) frame), the OFDMA-RA channel access mechanism is successful. However, if they choose one or more of the same OFDMA-RA sub-channel frequencies, a collision results. Accordingly, packets transmitted by electronic devices 220b and 220c on the same OFDMA-RA sub-channel frequency may not be received correctly, and thus acknowledgements may not be sent to electronic devices 220b and 220c. In this case, electronic device 220b and/or electronic device 220c may increase their contention window CW, such as by doubling the CW size until the CW size reaches a maximum value $CW_{max}$. $CW_{max}$ may be a common value for electronic devices 220.

In the event of contention between two or more of electronic devices 220, a contention technique may be used to assign sub-channels to two or more electronic devices 220 (e.g., OFDMA-S). OFDMA-S and OFDMA-RA may occur concurrently. For example, access point 210 may allocate/assign sub-frequencies to specific electronic devices 220 (OFDMA-S) and allocate/assign other sub-frequencies to be contention-based (OFDMA-RA).

OFDMA-RA may be beneficial in high-density scenarios to reduce the serialized access delay from electronic devices 220. In particular, parallel transmissions from electronic devices 220 may reduce or eliminate back-off delays. But, as the number of contending electronic devices 220 becomes large, the sub-channel contention success rate may decrease significantly. Some embodiments control the collision probability to improve the performance of OFDMA-RA, especially when the number of contending electronic devices increases.

Figure 3:
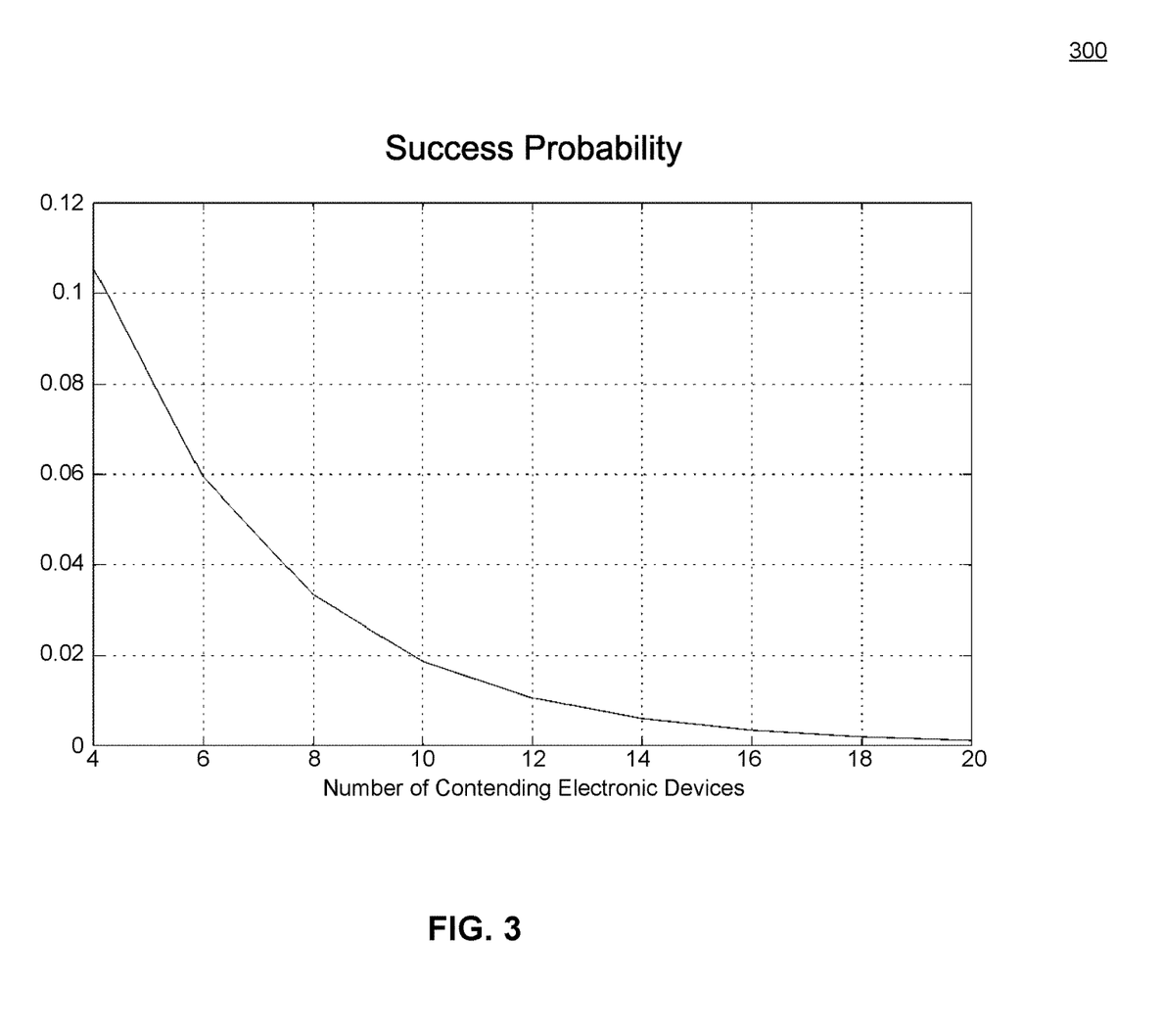
FIG. 3 illustrates an example of a success probability for an Orthogonal Frequency-Division Multiple Access (OFDMA) random access (OFDMA-RA) sub-channel frequency used with an increased number of contending electronic devices.

FIG. 3 illustrates an example 300 of a success probability for an OFDMA-RA sub-channel frequency used with an increased number of contending electronic devices. For example, the success probability for a successful use of an OFDMA-RA sub-channel frequency (or resource unit) when M electronic devices contend for N OFDMA-RA sub-channels is determined by $$\text{Success probability} = \frac{M!C(N,M)}{N^M},$$

where C(N, M) is a binomial coefficient. As shown in example 300, when four to 20 electronic devices or stations (STAs) contend for 4 OFDMA-RA sub-channels (or resource units), the successful use rate of an OFDMA-RA sub-channel drops quickly as the number of contending electronic devices increases.

Accordingly, some embodiments include a contention-group controlled approach to OFDMA-RA. In particular, collisions may be reduced by separating the electronic devices into different contention groups, for UL OFDMA-RA.

An access point may have an overall view or awareness of the potential collision situation. Therefore, the access point may control or reduce the collision probability in a manner that improves conditions for the electronic devices in communication with the access point. For example, the default number of groups can be set to 1. When multiple OFDMA-RA capable electronic devices associate, the access point may form more than one group to distribute the electronic devices into different contention groups. An access point may also reduce the number of contention groups when there are fewer potentially contending electronic devices.

Figure 4:
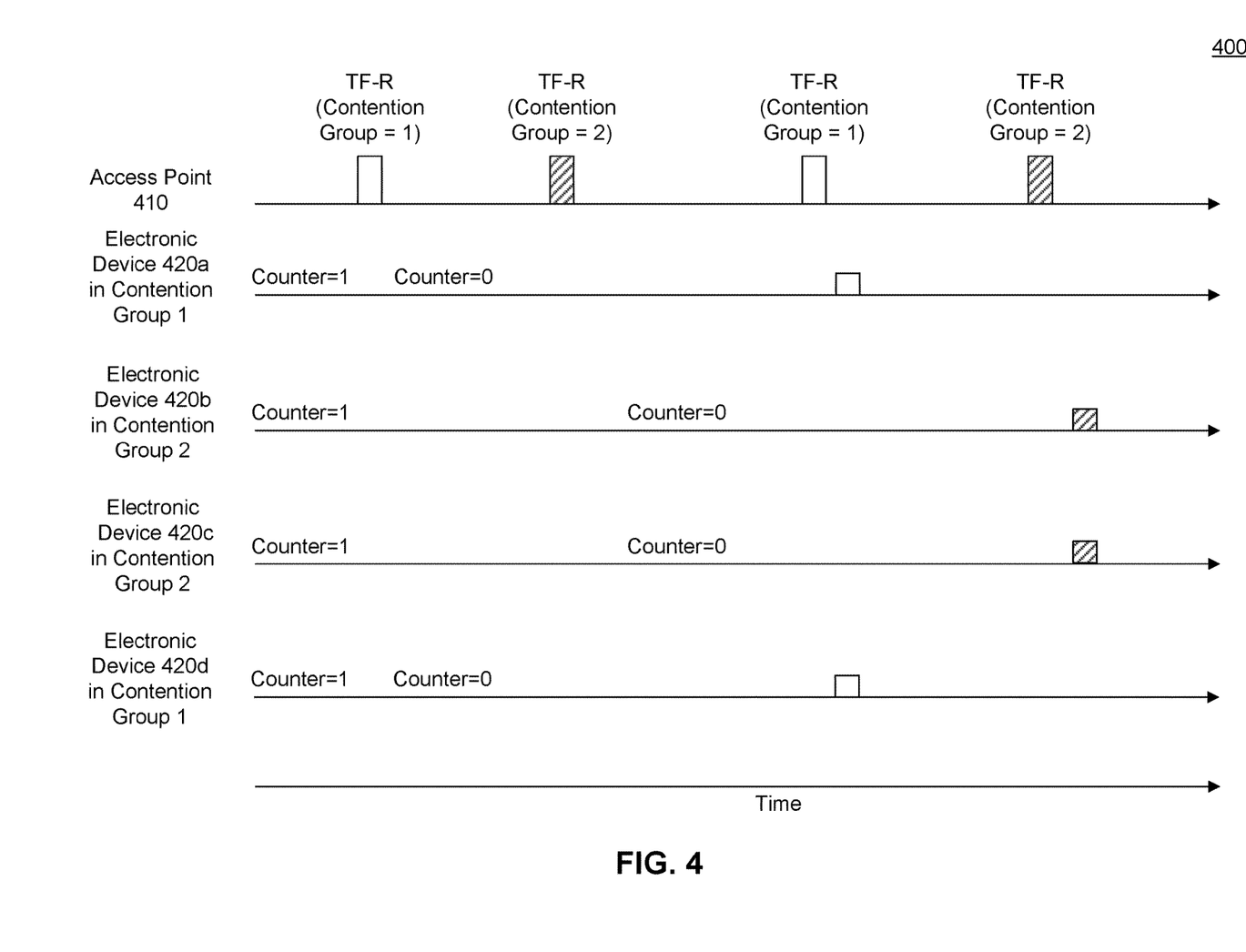
FIG. 4 illustrates a UL channel access mechanism, according to example embodiments of the disclosure.

FIG. 4 illustrates a UL channel access mechanism 400, according to example embodiments of the disclosure. Access point 410 is equivalent to access point 110 and electronic devices 420 are equivalent to electronic devices 120. In mechanism 400, electronic devices 420a and 420d are affiliated with contention group 1, while electronic devices 420b and 420c are affiliated with contention group 2. Transmissions affiliated with contention group 2 are noted with a pattern. In mechanism 400, counters in electronic devices 420a and 420d may count down (e.g., by '1') after receiving a TF-R frame that contains an appropriate contention group indication (such as a contention group number or identifier) for contention group 1. In some embodiments, a contention group indication may include a bit map, where for example, bit 1 corresponds to contention group 1, and bit 2 corresponds to contention group 2, and so on. Counters in electronic devices 420b and 420c may count down after receiving a TF-R frame that indicates contention group 2.

The initial counter value for devices 420a-420d may be equal to 1. When access point 410 transmits TF-R (contention group=1) frame, electronic devices 420a and 420d reduce their counters (e.g., the counters count down) while the counters in electronic devices 420b and 420c remain unchanged. Access point 410 transmits TF-R (contention group=2) frame, which is received by electronic devices 420a-420d. Neither of electronic devices 420a or 420d contend for an OFDMA-RA sub-channel identified in TF-R (contention group=2) frame even though their respective counters have satisfied their respective threshold values (e.g., a threshold value is 0). The counters in electronic devices 420b and 420c affiliated with contention group 2, however, count down to 0, and now satisfy their respective threshold values.

Access point 410 transmits a second TF-R (contention group=1) frame, which may be received by electronic devices 420a-420d. Since electronic devices 420a and 420d are affiliated with contention group 1, those devices may contend for an OFDMA-RA sub-channel(s) or resource unit(s) identified in the second TF-R (contention group=1) frame. Access point 410 transmits a second TF-R (contention group=2) frame which may be received by electronic devices 420a-420d. Electronic devices 420b and 420c may contend for an OFDMA-RA sub-channel(s) identified in the second TF-R (contention group=2) frame.

Alternatively, the electronic devices 420a-420d may count down for each TF-R frame received, regardless of any contention group indication. But, when a counter satisfies a threshold value (e.g., the counter value reaches 0), the corresponding electronic device 420 waits to receive a next TF-R frame that contains the affiliated contention group indication before randomly choosing one or more OFDMA-RA sub-channels identified in the next TF-R frame on which to transmit an UL frame.

An access point 410 may transmit a TF-R frame in a predictable manner (e.g., in time or frequency), so that an electronic device 420 may save power. In some embodiments, electronic device 420 enters a low power mode or a sleep mode, and awakes to transmit on a next TF-R frame. When the time intervals between TF-R frames are variable, the timing for the next TF-R frame may be transmitted in each TF-R frame. For example, the arrival time for the second TF-R (contention group=1) frame may be announced inside the first TF-R (contention group=1) frame so that electronic devices 420a and 420d may enter a sleep mode after receiving the first TF-R (contention group=1) frame and awake (e.g., resume normal operations) to receive the second TF-R (contention group=1) frame.

In some embodiments, the arrival of TF-R frames may be periodic, and access point 410 announces (e.g., transmits a beacon) to electronic devices 420a-420d a periodic interval between TF-R frames. Electronic devices 420a-420d may enter a sleep mode and wake before the periodic interval to receive a next TF-R frame. In another example, periodic intervals between TF-R frames are different for each contention group. Accordingly, the periodic intervals between TF-R frames of contention group 1 may be different than the periodic intervals between TF-R frames of contention group 2.

In comparison with non-group-based OFDMA-RA (e.g., OFDMA-S), the access delay in contention group-based OFDMA-RA may be higher in a lightly loaded system because an electronic device 420 may not start OFDMA-RA transmission after every TF-R frame (e.g., an electronic device 420 may wait for a TF-R with the affiliated contention group indication.) However, in a heavy loaded system, the collision and back-off procedure may incur a higher delay. Consequently, contention group-based OFDMA-RA may have better performance than OFDMA-S when many electronic devices 420 are contending.

Access point 410 may control and reduce the collision probabilities in a global-optimized manner by creating one or more contention groups implicitly or explicitly. To create a contention group implicitly, access point 410 may transmit a beacon indicating the number of contention groups established, and the receiving electronic devices 420 may perform an operation to identify an affiliation with one of the established contention groups. To create a contention group explicitly, an access point 410 may utilize criteria and/or combinations of various criteria regarding electronic devices 420 that are associated with access point 410. Access point 410 may also establish contention groups for pre-associated electronic devices 420. Access point 410 may notify electronic devices 420 of their explicit assignment to one or more contention groups in at least three ways: (1) transmit the assignment in response to electronic device 420's association with access point 410; (2) transmit the assignment via a new medium access control (MAC) frame; or (3) transmit the assignment via a beacon/broadcast of a mapping of electronic devices 420 to various contention groups.

Access point 410 may add or delete contention groups according to a settable collision probability threshold or range that is satisfied. The collision probability threshold or range may be based on a change in the collision probability. For example, when the collision probability increases to 30-40%, access point 410 may add a second contention group. When the collision probability decreases to 15% or decreases by 5%, access point 410 may remove a contention group.

Access point 410 may add or delete contention groups according to a device threshold that is satisfied. The device threshold may be based on a change in the number or percentage of electronic devices 420 associated with or in communication with access point 410. For example, when the number of electronic devices 420 satisfies the device threshold value (e.g., when nine electronic devices 420 communicate with access point 410, access point 410 may add a third contention group). In another example, when the percentage of electronic devices 420 in communication with access point 410 decreases by 10% and satisfies the device threshold, access point 410 may remove a contention group.

Electronic devices 420 may be implicitly grouped into contention groups. For example, electronic device 420a may be implicitly affiliated with a contention group based on an association identifier (AID) obtained when electronic device 420a associates with access point 410. Access point 410 may transmit a beacon or a broadcast that identifies a value M, where M represents the number of contention groups, and where M is an integer greater than zero. Electronic device 420a may receive the beacon or broadcast, and use the value M and its AID to determine a contention group number of the M contention groups with which electronic device 420a will be affiliated. As an example, electronic device 420a may determine a contention group number as follows: Contention Group Number Affiliation=AID modular by M.

Access point 410 may also transmit a beacon or a broadcast that identifies a change in the number of contention groups M, to N contention groups, where N is an integer greater than zero. Electronic devices receiving the beacon or broadcast update their contention group affiliations accordingly.

Access point 410 may explicitly assign electronic devices 420 randomly to contention groups, and/or assign electronic devices 420 to contention groups based on one or more criteria. Examples of the criteria include, but are not limited to an AID, a traffic type/Quality of Service (QoS) category, a power saving requirement, or an association status. Each of these are described further below.

Access point 410 may assign electronic devices 420 to various contention groups to control the collision probabilities as described above. The assignment may be random. For example, as new contention groups or added, or removed, access point 410 may change contention group assignments of electronic devices 420 accordingly.

Access point 410 may place electronic devices 420 into contention groups according to even or odd values of electronic devices 420's AID. For example, electronic devices 420 with odd value AIDs may be placed in contention group 1, while electronic devices 420 with even value AIDs may be placed in contention group 2. The values of AIDs are fixed so a corresponding AID-based contention group membership may be static.

Access point 410 may group electronic devices 420 into contention groups according to their traffic type/QoS category that indicates the priority of electronic device 420's transmissions. Examples of these requirements include access category (AC) and user priority (UP) as described in IEEE 802.11. Access point 410 may indicate for example, that a TF-R frame is available to a contention group of electronic devices 420 that have an AC value of 3 or a UP value of 4. The AC and/or UP values may dynamically change according to an application supported by electronic device 420 (e.g., voice traffic or messaging traffic). Accordingly, traffic type/QoS-based contention group membership may be dynamic.

Access point 410 may group electronic devices 420 into contention groups according to a power saving requirement requested by an electronic device 420, for example, during association. The power saving requirement may include a sleep/awake pattern requested through a target wakeup time (TWT) mechanism. For example, some electronic devices 420 may need to sleep longer, and thus the TF-R frames for that particular contention group can be transmitted less frequently, with a longer time interval between TF-R frames. Access point 410 may group electronic devices 420 with similar sleep/awake patterns in a contention group.

Access point 410 may group electronic devices 420 into contention groups according to their association status. An association status indicates whether an electronic device 420 is associated or unassociated with access point 410. Access point 410 may indicate that a TF-R frame is only available to electronic devices 420 that are unassociated (or pre-associated) with access point 410. Electronic device 420's association status is dynamic and changes (e.g., from pre-associated to associated).

In some embodiments, an access point may apply multiple criteria concurrently to affiliate electronic devices 420a-420d with a variety of contention groups. For example, access point 410 may determine that electronic devices 420 affiliated with contention group 1 concurrently satisfy the following criteria: they have an even value AID, support traffic type/QoS with a UP=4, and have requested a particular sleep awake pattern. In some embodiments, electronic device 420 may be assigned to more than one contention group at a time. For example, access point 410 may assign electronic device 420 is to contention group 1 due to an even number AID value, and assign electronic device 420 to contention group 2 due to a power saving pattern. In another example, electronic device 420 implicitly determines an assignment to contention group 1, and access point 410 assigns electronic device 420 to contention group 2 due to a power saving pattern. When electronic device 420 is assigned to both contention group 1 and contention group 2, the counter of electronic device 420 counts down when a TF-R with a contention group 1 indication or a contention group 2 indication is received. Many variations are possible as would be understood by a person of ordinary skill in the art.

In some embodiments, a contention group indication may include a bit map. One or more bits of a bit map may correspond with a criteria which may correlate to one or more contention groups. For example bit 1 correlates to criteria 1, and bit 2 correlates to criteria 2. An electronic device 420a with criteria 1 may be assigned to contention group 1, and electronic device 420b with criteria 2 may be assigned to contention group 2. Electronic device 420c with both criteria 1 and criteria 2 may be assigned to contention groups 1 and 2, and/or assigned to contention group 3 (not shown).

Access point 410 may assign electronic device 420d to contention group 1 and transmit the assignment notification to electronic device 420d via at least three means. In a first example, access point 410 transmits contention group number 1 to electronic device 420d in response to electronic device 420d associating with access point 410 (e.g., announced by access point 410 in an association response). In a second example, an assignment of electronic device 420d to contention group 1 may be transmitted by access point 410 via a new MAC frame. In a third example, the assignment of electronic device 420d to contention group 1 may be conveyed via a beacon that includes a mapping between electronic devices 420 and contention groups 1 and 2.

Referring to the new MAC frame, some embodiments may include: defining new fields for a new MAC management frame (e.g., for an action frame type, define a new category value, and new action details values); and/or defining a new information element that may be contained in a new MAC frame or added to existing MAC management frames. The information contained in the action frame or in a new information element may include the data and/or criteria described above for implicit and/or explicit contention group assignments.

Figure 5:
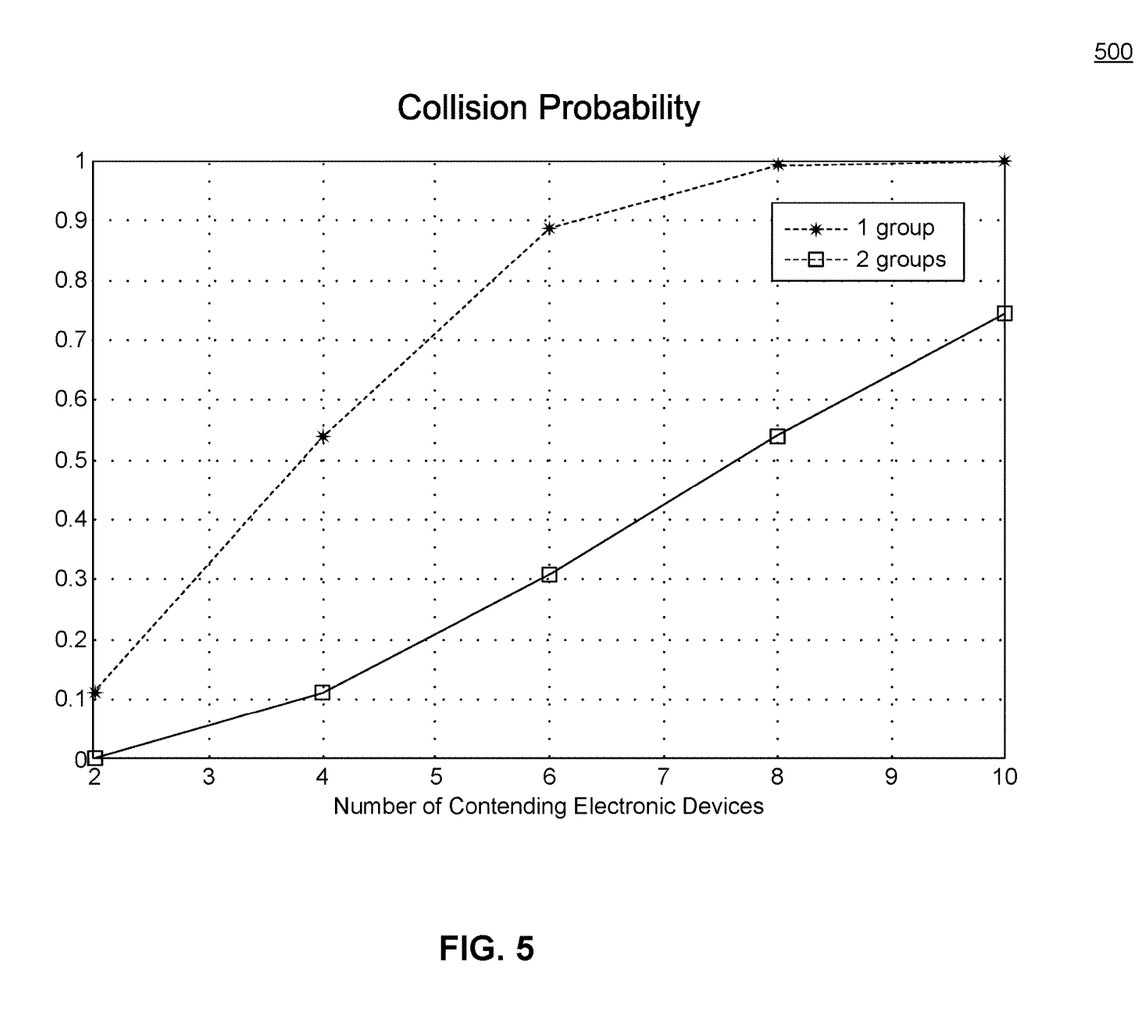
FIG. 5 illustrates an example of a collision probability with contention groups, according to example embodiments of the disclosure.

FIG. 5 illustrates an example 500 of collision probability with contention groups, according to example embodiments of the disclosure. The collision probability when a single contention group is established shown in contrast to the reduced collision probability when two contention groups are established. The collision probability can be reduced by adding a second contention group.

Figure 6:
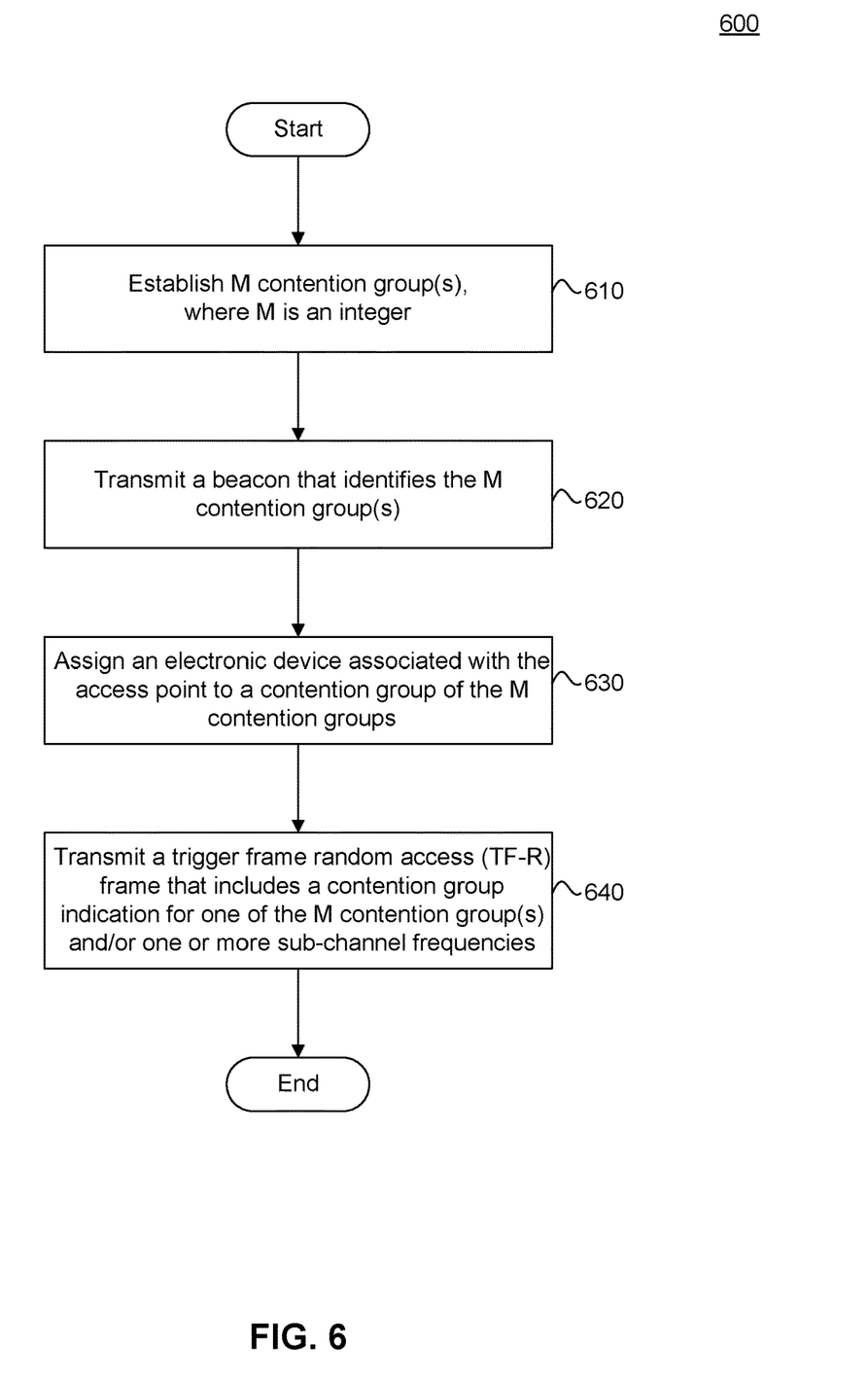
FIG. 6 illustrates a method for a UL channel access mechanism, according to example embodiments of the disclosure.

FIG. 6 illustrates a method 600 for a UL channel access mechanism, according to example embodiments of the disclosure. For explanation purposes and not a limitation, method 600 is described with regard to FIG. 4. For example, method 600 may be performed by access point 410 of mechanism 400 in FIG. 4, in accordance with examples of the present disclosure. It is to be appreciated that not all steps may be needed to perform the disclosure provided herein. Further, some of the steps may be performed simultaneously, or in a different order than shown in FIG. 6, as will be understood by a person of ordinary skill in the art.

At step 610, access point 410 determines a number of contention groups needed and establishes M contention group(s), where M is an integer greater than 1. Access point 410 may determine the number of contention groups based on a collision probability threshold being satisfied and/or a device threshold being satisfied. Access point 410 may establish a contention group of the M contention groups implicitly or explicitly. Method 600 proceeds to step 620.

At step 620, access point 410 transmits a beacon that identifies the M contention group(s). One or more electronic devices 420 associated with access point 410 may perform an operation using the number of M contention groups and electronic device 420's AID obtained from an association with access point 410. For example, electronic device 420a may perform an AID modular by M operation to implicitly obtain an assignment to contention group 1. Method 600 proceeds to step 630.

At step 630, access point 410 assigns an electronic device 420 associated with access point 410 to a contention group of the M contention groups. Access point 410 may assign an electronic device 420 to a contention group randomly, or based on one or more criteria. For example, access point 410 may assign electronic device 420c to contention group 3 (not shown), where electronic devices 420 affiliated with contention group 3 meet the following criteria: have an even value AID, and a traffic type/QoS category of AC=2.

Access point 410 may notify electronic device 420c of an assignment to contention group 3 in one of three ways: in response to electronic device 420c associating with access point 410; via a new MAC frame; or in a beacon that maps electronic device 420c to contention group 3. Method 600 proceeds to step 640.

At step 640, access point 410 transmits a TF-R frame that includes a contention group indication of the M contention group(s) and/or one or more OFDMA-RA sub-channel frequencies available for contention. For example, when the TF-R frame indicates contention group 2 and an OFDMA-RA sub-channel frequency, the electronic devices 420 whose counters have satisfied their respective counter thresholds and are affiliated with contention group 3, may transmit on the OFDMA-RA sub-channel frequency. Method 600 ends.

Figure 7:
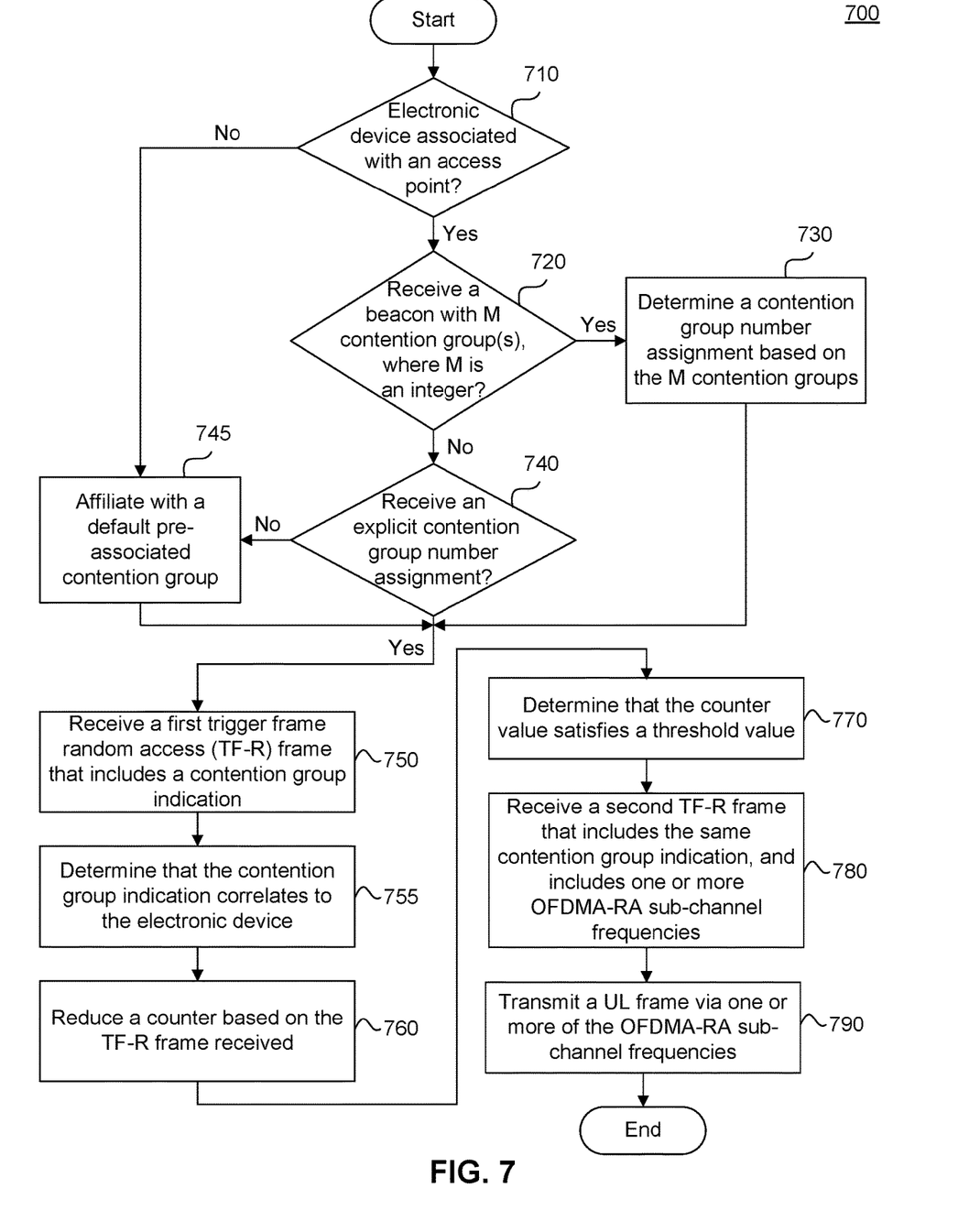
FIG. 7 illustrates another method for a UL channel access mechanism, according to example embodiments of the disclosure.

FIG. 7 illustrates another method 700 for a UL channel access mechanism, according to example embodiments of the disclosure. For explanation purposes and not a limitation, method 700 may be described with regard to FIG. 4. For example, method 700 may be performed by an electronic device 420 of mechanism 400 in FIG. 4, in accordance with embodiments of the present disclosure. It is to be appreciated that not all steps may be needed to perform the disclosure provided herein. Further, some of the steps may be performed simultaneously, or in a different order than shown in FIG. 7, as will be understood by a person of ordinary skill in the art.

At step 710, a determination is made whether electronic device 420a is associated with access point 410. When electronic device 420a is not associated, method 700 proceeds to step 745. When electronic device 420a is associated, method 700 proceeds to step 720.

At step 720, a determination is made whether electronic device 420a receives a beacon from access point 410 that indicates M contention groups, where M is an integer greater than zero. When electronic device 420a does not receive a beacon, method 700 proceeds to step 740. When electronic device 420a receives a beacon, method 700 proceeds to step 730.

At step 730, electronic device 420a determines a contention group number based on the M contention groups and an AID obtained from associating with access point 410. Electronic device 420a may be implicitly assigned to the determined contention group number. Method 700 proceeds to step 750.

At step 740, a determination is made whether electronic device 420a receives an explicit contention group number assignment. For example, electronic device 420a may receive an assignment to contention group 1 in one of three ways: (1) in response to associating with access point 410; (2) via a new MAC frame; or (3) via a beacon or broadcast indicating mapping of electronic device 420a with contention group 1.

When an explicit assignment is received, method 700 proceeds to step 750. When an explicit assignment is not received, method 700 proceeds to step 745.

At step 745, electronic device 420a may affiliate with a contention group for electronic devices that satisfy a pre-associated status.

At step 750, electronic device 420a receives a first TF-R frame that includes a contention group indication. Method 700 proceeds to step 755.

At step 755, electronic device 420a determines that the contention group indication received at step 750 correlates to electronic device 420a: satisfies the contention group number of the electronic device 420a received in step 740, satisfies the contention group number determined in step 730, is affiliated in step 745, and/or satisfies a criteria of electronic device 420*a*. Method 700 proceeds to step 760.

At step 760, electronic device 420*a* reduces a counter value. For example, electronic device 420*a* counts down by 1. Method 700 proceeds to step 770.

At step 770, electronic device 420*a* determines that the counter value satisfies a threshold value. For example, the threshold value may be 0. Method 700 proceeds to step 780.

At step 780, electronic device 420*a* receives a second TF-R frame that includes the same contention group indication as the first TF-R frame and includes one or more OFDMA-RA sub-channel frequencies. Electronic device 420*a* determines that the included contention group indication satisfies the contention group number of electronic device 420*a*. Method 700 proceeds to step 790.

At step 790, electronic device 420*a* transmits an UL frame on one or more of the OFDMA-RA sub-channel frequencies identified in the second TF-R frame. Method 700 ends.

Figure 8:
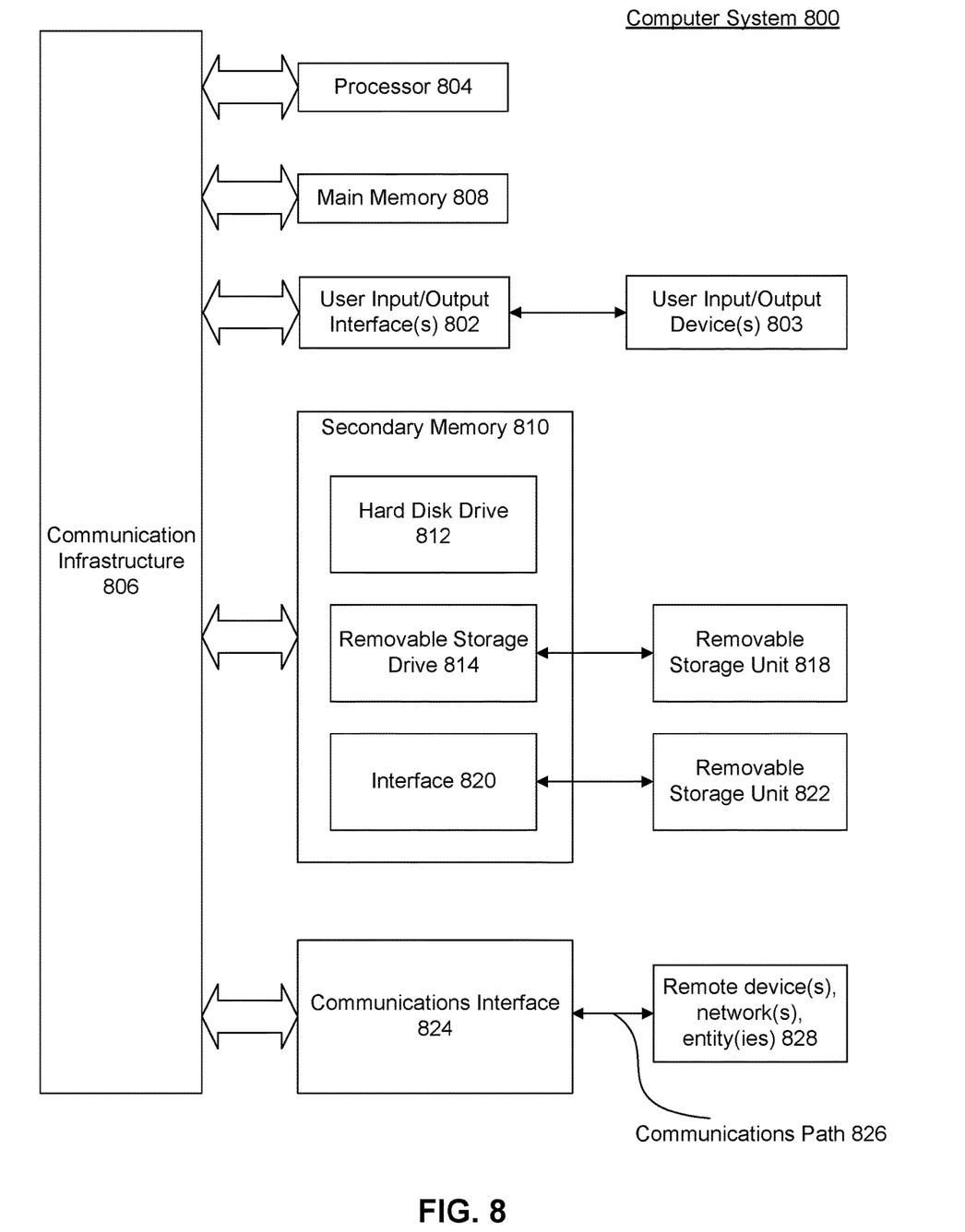
FIG. 8 is an example computer system for implementing various embodiments.

Various embodiments can be implemented, for example, using one or more well-known computer systems, such as computer system 800 shown in FIG. 8. Computer system 800 can be any well-known computer capable of performing the functions described herein. For example, and without limitation, processing systems 110, 120, 410, 420, (and/or other apparatuses and/or components shown in the figures) may be implemented using computer system 800, or portions thereof.

Computer system 800 includes one or more processors (also called central processing units, or CPUs), such as a processor 804. Processor 804 is connected to a communication infrastructure or bus 806.

Computer system 800 also includes user input/output device(s) 803, such as monitors, keyboards, pointing devices, etc., that communicate with communication infrastructure 806 through user input/output interface(s) 802.

Computer system 800 also includes a main or primary memory 808, such as random access memory (RAM). Main memory 808 may include one or more levels of cache. Main memory 808 has stored therein control logic (i.e., computer software) and/or data.

Computer system 800 may also include one or more secondary storage devices or memory 810. Secondary memory 810 may include, for example, a hard disk drive 812 and/or a removable storage device or drive 814. Removable storage drive 814 may be a floppy disk drive, a magnetic tape drive, a compact disk drive, an optical storage device, tape backup device, and/or any other storage device/drive.

Removable storage drive 814 may interact with a removable storage unit 818. Removable storage unit 818 includes a computer usable or readable storage device having stored thereon computer software (control logic) and/or data. Removable storage unit 818 may be a floppy disk, magnetic tape, compact disk, DVD, optical storage disk, and/any other computer data storage device. Removable storage drive 814 reads from and/or writes to removable storage unit 818 in a well-known manner.

According to an exemplary embodiment, secondary memory 810 may include other means, instrumentalities or other approaches for allowing computer programs and/or other instructions and/or data to be accessed by computer system 800. Such means, instrumentalities or other approaches may include, for example, a removable storage unit 822 and an interface 820. Examples of the removable storage unit 822 and the interface 820 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 800 may further include a communication or network interface 824. Communication interface 824 enables computer system 800 to communicate and interact with any combination of remote devices, remote networks, remote entities, etc. (individually and collectively referenced by reference number 828). For example, communication interface 824 may allow computer system 800 to communicate with remote devices 828 over communications path 826, which may be wired and/or wireless, and which may include any combination of LANs, WANs, the Internet, etc. Control logic and/or data may be transmitted to and from computer system 800 via communication path 826.

The operations in the preceding embodiments can be implemented in a wide variety of configurations and architectures. Therefore, some or all of the operations in the preceding embodiments may be performed in hardware, in software or both. For example, at least some of the operations may be implemented using firmware in communications interface 824 and/or the PHY layer of communications interface 824, such as hardware in an interface circuit. In particular, OFDMA may be implemented in the PHY layer, timing may be implemented in a lower portion of the data-link or MAC layer, and management may be implemented in an upper portion of the data-link or MAC layer (such as in a driver).

In an embodiment, a tangible apparatus or article of manufacture comprising a tangible computer useable or readable medium having control logic (software) stored thereon is also referred to herein as a computer program product or program storage device. This includes, but is not limited to, computer system 800, main memory 808, secondary memory 810, and removable storage units 818 and 822, as well as tangible articles of manufacture embodying any combination of the foregoing. Such control logic, when executed by one or more data processing devices (such as computer system 800), causes such data processing devices to operate as described herein.

Based on the teachings contained in this disclosure, it will be apparent to persons skilled in the relevant art(s) how to make and use embodiments of the invention using data processing devices, computer systems and/or computer architectures other than that shown in FIG. 8. In particular, embodiments may operate with software, hardware, and/or operating system implementations other than those described herein.

It is to be appreciated that the Detailed Description section, and not the Summary and Abstract sections, is intended to be used to interpret the claims. The Summary and Abstract sections may set forth one or more but not all exemplary embodiments of the invention as contemplated by the inventor(s), and thus, are not intended to limit the invention or the appended claims in any way.

While the invention has been described herein with reference to exemplary embodiments for exemplary fields and applications, it should be understood that the invention is not limited thereto. Other embodiments and modifications thereto are possible, and are within the scope and spirit of the invention. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments may perform functional blocks, steps, operations, methods, etc. using orderings different than those described herein.

References herein to "one embodiment," "an embodiment," "an example embodiment," or similar phrases, indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein.

The breadth and scope of the invention should not be limited by any of the above-described exemplary embodiments, but should be defined only in accordance with the following claims and their equivalents.

What is claimed is:

1. An electronic device comprising:
   a transceiver; and
   a processor coupled to the transceiver, configured to:
   receive, in response to the electronic device associating with an access point, a contention group assignment of M possible contention groups;
   receive, during an Orthogonal Frequency Division Multiple Access (OFDMA)-random access (RA) communication, a first trigger frame random access (TF-R) frame corresponding to the contention group assignment for the electronic device;
   reduce a counter value responsive to receiving the first TF-R frame;
   determine that the counter value satisfies a threshold value;
   receive a second TF-R frame that corresponds to the contention group assignment for the electronic device, wherein the second TF-R frame comprises a first OFDMA-RA sub-channel frequency; and
   transmit a first frame via the first OFDMA-RA sub-channel frequency.

2. The electronic device of claim 1, wherein the processor is further configured to:
   enter a sleep mode after receiving the first TF-R frame, wherein the first TF-R frame comprises an arrival time for the second TF-R frame; and
   wake from the sleep mode based at least on the arrival time for the second TF-R frame.

3. The electronic device of claim 1, wherein the processor is further configured to:
   receive a beacon comprising a periodic interval associated with TF-R frames;
   enter a sleep mode; and
   wake according to the periodic interval.

4. The electronic device of claim 3, wherein the periodic interval is different for a first contention group of the M contention groups than for a second contention group of the M contention groups.

5. The electronic device of claim 1, wherein the contention group assignment is based at least on a random assignment.

6. The electronic device of claim 1, wherein the contention group assignment is based at least on an even or odd value of an association ID (AID) of the electronic device.

7. The electronic device of claim 1, wherein the contention group assignment is based at least on a traffic type or a quality of service (QoS), wherein the traffic type or QoS indicates a priority of transmissions of the electronic device.

8. The electronic device of claim 7, wherein the traffic type or QoS comprises an access category (AC) value or a user priority (UP) value.

9. The electronic device of claim 8, wherein the AC value or the UP value of the electronic device dynamically changes according to an application supported by the electronic device.

10. The electronic device of claim 1, wherein the processor is further configured to transmit to an access point (AP), a power saving requirement comprising a sleep/awake pattern, wherein the contention group assignment is based at least on the sleep/awake pattern.

11. The electronic device of claim 1, wherein the contention group assignment comprises a bit map, wherein at least one bit in the bit map correlates to a criterion associated with the contention group assignment.

12. The electronic device of claim 1, wherein the contention group assignment is received via a new medium access control (MAC) frame comprising an action frame type or a new information element.

13. The electronic device of claim 12, wherein the action frame type or the new information element comprises criteria for an additional contention group assignment.

14. The electronic device of claim 1, wherein the contention group assignment is received via a beacon that comprises a mapping between the electronic device and the contention group assignment.

15. An method for an electronic device comprising:
   receiving, in response to the electronic device associating with an access point, a new medium access control (MAC) frame comprising a contention group assignment of M possible contention groups;
   receiving, during an Orthogonal Frequency Division Multiple Access (OFDMA)-random access (RA) communication, a first trigger frame random access (TF-R) frame corresponding to the contention group assignment of the electronic device;
   reducing a counter value responsive to receiving the first TF-R frame;
   determining that the counter value satisfies a threshold value;
   receiving a second TF-R frame that corresponds to the contention group assignment, wherein the second TF-R frame comprises a first OFDMA-RA sub-channel frequency; and
   transmitting a first frame via the first OFDMA-RA sub-channel frequency.

16. The method of claim 15, further comprising:
   entering a sleep mode after receiving the first TF-R frame, wherein the first TF-R frame comprises an arrival time for the second TF-R frame; and
   waking from the sleep mode based at least on the arrival time for the second TF-R frame.

17. The method of claim 15, wherein the contention group assignment is based on a sleep/awake pattern of the electronic device.

18. The method of claim 15, wherein the new MAC frame comprises criteria for an additional contention group assignment.

19. The method of claim 15, further comprising:
- receiving a beacon comprising a periodic interval associated with TF-R frames;
- entering a sleep mode; and
- waking according to the periodic interval.

20. A non-transitory computer-readable medium having instructions stored therein, which when executed by a processor cause the processor to perform operations, the operations comprising:
- receiving from an access point, a new medium access control (MAC) frame comprising criteria for a contention group assignment;
- receiving, during an Orthogonal Frequency Division Multiple Access (OFDMA)-random access (RA) communication, a first trigger frame random access (TF-R) frame;
- determining that the first TF-R frame corresponds to a contention group assignment corresponding to the criteria;
- reducing a counter value based on the determination that the first TF-R frame corresponds to the contention group assignment;
- receiving a second TF-R frame that corresponds to the contention group assignment, wherein the second TF-R frame comprises a first OFDMA-RA sub-channel frequency; and
- transmitting a first frame via the first OFDMA-RA sub-channel frequency.

* * * * *